March 11, 1952     R. ANNEN     2,588,459

HIGH-SPEED SPINDLE

Filed March 20, 1948

Patented Mar. 11, 1952

2,588,459

UNITED STATES PATENT OFFICE 2,588,459

HIGH-SPEED SPINDLE

Robert Annen, Bienne, Switzerland, assignor to Roulements á Billes Miniatures S. A., Bienne, Switzerland Application March 20, 1948, Serial No. 16,069
In Switzerland March 26, 1947

5 Claims. (Cl. 308—189)

My invention relates to high-speed spindles.

High-speed grinding spindles in which radial ball bearings arranged in groups are finished with a precision allowing the bearings to turn substantially without any play and to bear substantially equal load portions are well-known in the art. In spite of this high precision in manufacture, these spindles are very rapidly out of service owing to the unavoidable play occurring in the bearings after 500 to 600 hours of operation.

In other well-known spindles, ball bearings with shoulders are provided, separated from one another by distance pieces whose thickness may be diminished after every 400 to 600 hours of operation in order to take up the play. This treatment of the distance pieces, however, is a delicate work and requires a disassembling of the spindles.

Spindles in which the distance pieces are replaced by initially tensioned springs arranged for automatically compensating the wear and tear and play of the bearings are not very recommendable. These initial tensions diminish very considerably the life of the spindles and the stability of their shafts.

It is an object of my invention to provide a high-speed spindle which is distinguished from the known types by great simplicity. Bearings without play and being perfectly parallel, threads, distance pieces and springs are no longer necessary in my spindle.

In order to obtain this aim I provide in my high-speed spindle ball bearings with shoulders comprising balls whose diameters and numbers are so chosen that the centrifugal force applied to the balls displaces them between the races and provokes an axial reaction guaranteeing a stable support of the outer racerings of the bearings, the centrifugal force, on displacing the balls, takes automatically up the play of the ball bearings, compensates at the same time the effects of the differences of dilatations and counteracts any radial and axial displacement of the shaft of the spindle during operation.

Other objects and features will be apparent as the following description proceeds, reference being had to the accompanying drawings, showing by way of example two embodiments of my invention. It is understood that the invention is not necessarily limited thereto, as various changes in the shape, proportions and general assemblage of the parts may be resorted to without departing from the principle of the invention or sacrificing any of its advantages.

Fig. 3 is a section along the line I—II of Fig. 2, and in

Figure 1:
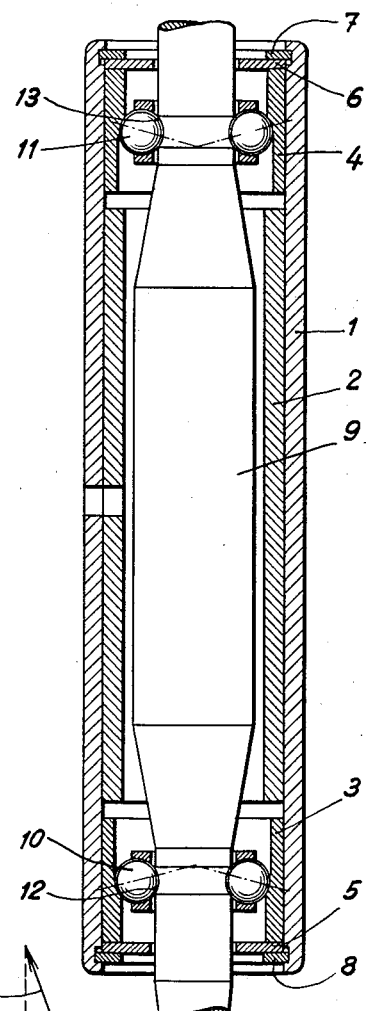
Fig. 1 is an axial section through a spindle built for a speed of 120,000 revolutions per minute.

In Fig. 1 a stiffening sleeve 2 is pressed into the outer sleeve 1. The outer racerings 3 and 4 of the ball bearings are adjusted in the sleeve 1 with sliding seat. These rings bear against end washers 5 and 6 secured by spring washers 7 and 8. The shaft 9 rotates in rows of balls 10 and 11.

In order that the initial angle of pressure upon the balls may be 8 degrees when the shaft 9 has attained its normal speed, the bearings must be made with a play of about 0.01 mm.

On mounting the spindle, the thickness of the end washers 5 and 6 is adjusted in such a way that the play of the shaft 9 is not greater than 2 to 3 microns. On normal running, the centrifugal force 27 (Fig. 4) acts upon the balls 26. The component 28 presses these balls between the races. The reaction 30 presses the outer racerings 3 and 4 against the washers 5 and 6. The reactions 30 of both bearings acting upon the shaft 9 in opposite directions are in equilibrium so that the shaft 9 would not be axially displaced even if it be loaded by very great forces.

On normal running the shaft 9 gets somewhat warmer than the sleeve 1 so that the angle of pressure upon the balls decreases very slightly. This modification of the angle of pressure upon the balls becomes possible only when the shaft 9 rotates at a certain speed. The extensions resulting from variations in temperature are thus automatically compensated by the system.

Figure 2:
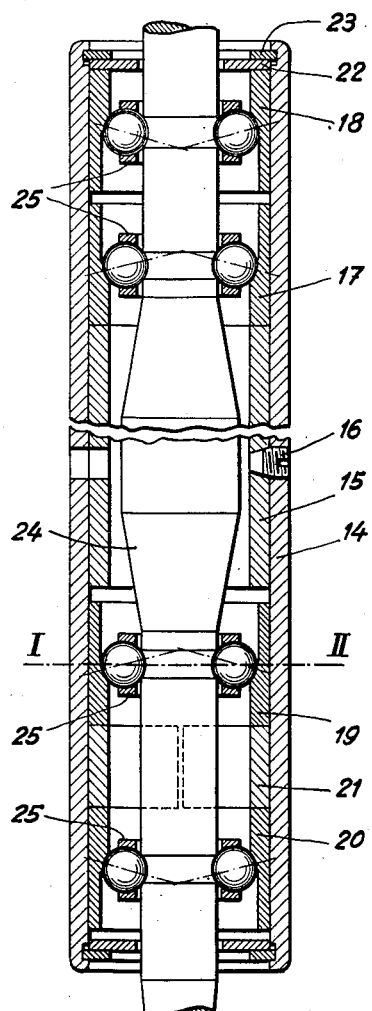
Fig. 2 is an axial section through a spindle built for a speed of 60,000 revolutions per minute.

The principles of design of the spindle shown in Fig. 2 are the same as those mentioned above with regard to Fig. 1, but this second spindle is built for a speed of 60,000 rev. per min. and for much greater grinding forces. For this reason it has four ball bearings 17, 18, 19 and 20 which are very much sturdier than those of the first embodiment. The scale of Fig. 2 is reduced with regard to that of Fig. 1.

The stiffening sleeve 15 is adjusted in the outer sleeve 14 with sliding seat and held by the screw 16 in order to serve as an abutment means for the outer racering 17 of one of the ball bearings. The outer racering 18 of another ball bearing bears against an end washer 22 secured by the spring washer 23.

The outer racerings 19 and 20 bear against the distance piece 21. The length of this distance piece is so chosen that the bearings with the outer racerings 19 and 20, mounted on the shaft 24, have but an infinitely small play. This distance piece 21 is subdivided into two semi-rings so that it may be slipped between the racerings 19 and 20.

The outer racerings 17, 18, 19 and 20 and the distance piece 21 are adjusted with sliding seat in the sleeve 14 so that the whole set of these pieces together with the shaft 24 and the sleeve 15 may be assembled outside the sleeve 14 and then inserted into the latter.

The running conditions of the spindle are the same as those of the spindle of Fig. 1.

The differences of dilatation of the shaft 24 between the bearings with the racerings 17 and 18 are compensated by these bearings as in the embodiment of Fig. 1, with the single difference that the compensation results in a very small augmentation of the angles of pressure upon the balls.

The ball bearings with the racerings 19 and 20 and the distance piece 21 form the hind support of the spindle which can slide in the sleeve 14 under the influence of the variable dilatations of the shaft 24.

In order to obtain a centrifugal force sufficient for the axial securing of the shaft 24 and the total suppressions of play under the conditions existing in the case of Fig. 1, the diameter of the balls must be substantially equal to 0.85 times the smallest diameter of the races of the shaft.

Figure 3:
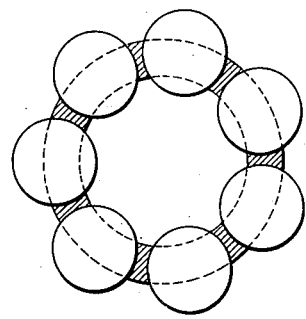

The ball cages 25 (Fig. 3) are designed to receive as many balls as possible. The balls 26 can be taken out of the holes of the cage when the outer racerings are removed or sufficiently withdrawn to uncover the balls.

Figure 4:
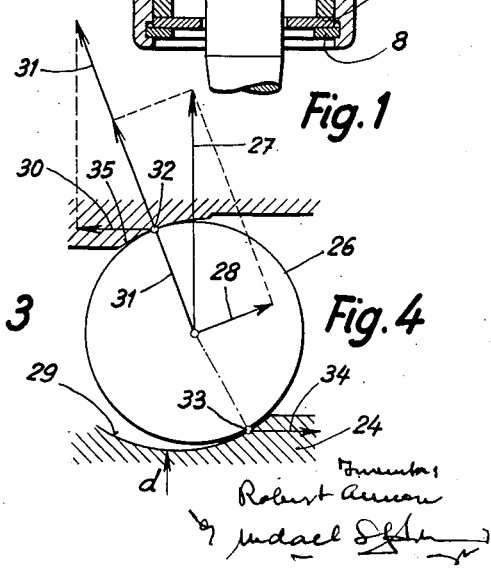
Fig. 4 is a diagram with a parallelogram of forces demonstrating the centrifugal force acting upon the balls.

In Fig. 4 is shown how the centrifugal force 27 acts on ball 26 to displace it between raceways 29 and 35 until its bears on the latter at contact points 32 and 33, the balls thus being caused to ascend on race 29 of shaft 24. The centrifugal force 27 then constantly has the tendency to have the ball turning around the point 32 and thus produces a pressure onto the point 33, the axial component 34 of which balances the equal and opposed component produced by a ball of the other ball bearing of the pair of bearings, thus centering the shaft 9 or 24 and holding it firmly in an axial position which is an equilibrium position. The normal component 31 acting on the point 32, of the centrifugal force 27, has an axial component 30 which urges the exterior ring of the bearing against a rest shoulder or abutment.

In order to obtain an initial angle of pressure which is the angle comprised between the contact diameter 32, 33 of a ball and the direction of the centrifugal force acting on this ball, equal to substantially 8°, with a radial play of the balls amounting to a mean value of 0.01 mm., the curvature radius of the raceways must then be substantially 1.1 times the radius of these balls.

The width of the outer racerings of all the bearings of these spindles is at least equal to three times the diameter of the balls in order to guarantee stability to these rings and to prevent, due to their adherence to the sleeves 1 and 14, their rotation in these sleeves.

One might give the balls an excessive size in order to augment the centrifugal force. This solution would, however, show the inconvenience of an unnecessary increase of the load and of wear and tear of the bearings.

The number of groups comprising two bearings is determined by the load and the maximum speeds applied to the bearings. These loads and speeds, at the same time, determine the value of the centrifugal force.

With the purpose of simplifying the manufacture and of guaranteeing the utmost possible alignment of the bearings, the outer sleeves 1 and 14 are made without any inner shoulder.

While I have described and illustrated two embodiments of my invention, I do not wish to unnecessarily limit the scope of this invention, but reserve the right to make such modifications and rearrangements of the several parts as may come within the purview of the accompanying claims.

What I claim is:

1. A high speed spindle assembly comprising, in combination, an outer elongated tubular casing; an elongated shaft of a substantially smaller transverse cross-sectional area than the inner transverse cross-sectional area of said casing and mounted within said casing with its longitudinal axis substantially parallel to the longitudinal axis of said casing; a pair of inner ball bearing raceway portions located on said shaft, said inner raceway portions being spaced from each other; a pair of outer oppositely directed, angular ball bearing raceway portions connected to the inner surface of said casing and located respectively opposite to said inner raceway portions; and a plurality of ball members each having a radius of curvature which is smaller than the radius of curvature of each of said raceway portions and being mounted with clearance between said inner and outer raceway portions, whereby said shaft, when at rest, has play in said casing both in axial and radial directions so that when said shaft is rotated said ball members move along said raceway portions into a position in contact with said inner and outer raceway portions so as to take up said clearance, thereby automatically bearing against said inner and outer raceway portions to maintain the longitudinal axis of said shaft coincident with the longitudinal axis of said casing.

2. A high speed spindle assembly comprising, in combination, an outer elongated tubular casing; an elongated shaft of a substantially smaller transverse cross-sectional area than the inner transverse cross-sectional area of said casing and mounted within said casing with its longitudinal axis substantially parallel to the longitudinal axis of said casing; a pair of inner ball bearing raceway portions located on said shaft, said inner raceway portions being spaced from each other; a pair of outer oppositely directed, angular ball bearing raceway portions connected to the inner surface of said casing and located respectively opposite to said inner raceway portions, each pair of said inner and outer raceway portions having their inner and outer raceways provided with transverse sectional arcuate curvatures having centers which are offset in the axial direction of said casing and respectively having radii which are greater than one half of the distance between the outermost part of the outer raceway and the innermost part of the inner raceway; and a plurality of ball members each having a radius of curvature which is smaller than the radius of curvature of each of said raceway portions and being mounted with clearance between said raceway portions and each having a diameter which is smaller than the distance between the inner and outer raceways of each pair of raceways along a line passing through said centers of curvature, whereby said shaft, when at rest, has play in said casing both in axial and radial directions so that when said shaft is rotated said ball members move along said raceway portions into a position in contact with said inner and outer raceway portions so as to take up said clearance, thereby automatically bearing against said inner and outer raceway portions to maintain the longitudinal axis of said shaft coincident with the longitudinal axis of said casing.

3. A high speed spindle assembly comprising, in combination, an outer elongated tubular casing; an elongated shaft of a substantially smaller transverse cross-sectional area than the inner transverse cross-sectional area of said casing and mounted within said casing with its longitudinal axis substantially parallel to the longitudinal axis of said casing; at least two spaced annular first surface portions located on said shaft and facing in opposite directions; at least two spaced second annular surface portions located on the inner surface of said casing and opposite to said first annular surface portions, respectively, said two second annular surface portions also facing in opposite directions, and each pair of first and second annular surface portions which are located opposite to each other facing in opposite directions and confronting each other, one of said pair of opposite first and second annular surface portions approaching each other in one axial direction along said casing and the other of said pair of first and second opposite annular surface portions approaching each other in the other axial direction along the said casing, so that each of said pairs of opposite first and second annular surface portions are nearer to each other at one of their opposite edges than they are at the other of their opposite edges; and a plurality of ball members each having a radius of curvature which is smaller than the radius of curvature of each of said annular surface portions and being mounted with clearance between said first and second opposite annular surface portions of each of said pairs of annular surface portions, whereby, when said shaft is at rest, it has axial and radial play in said casing, and whereby when said shaft is rotating said ball members move along each pair of first and second annular surface portions into a position in contact with both opposite surface portions of said pairs of annular surface portions so as to take up said clearance, thereby automatically bearing against the latter surface portions so as to maintain the longitudinal axis of said shaft coincident with the longitudinal axis of said casing.

4. A high speed spindle assembly comprising, in combination, an outer elongated tubular casing; an elongated shaft of a substantially smaller transverse cross-sectional area than the inner transverse cross-sectional area of said casing and mounted within said casing with its longitudinal axis substantially parallel to the longitudinal axis of said casing; a pair of inner ball bearing raceway portions located on said shaft, said inner raceway portions being spaced from each other; a pair of outer oppositely directed, angular ball bearing raceway portions connected to the inner surface of said casing and located respectively opposite and in slightly offset relation with respect to said inner raceway portions; and a plurality of ball members each having a radius of curvature which is smaller than the radius of curvature of each of said raceway portions and being mounted with clearance between said inner and outer raceway portions, said ball members each having a diameter which is greater than the distance between the points of each of said pair of inner and outer raceway portions which are located nearest to each other and smaller than the distance between the points of said inner and outer raceways which are at the greatest distance from each other, whereby said shaft, when at rest, has play in said casing both in axial and radial directions so that when said shaft is rotated said ball members move along said raceway portions into a position in contact with said inner and outer raceway portions so as to take up said clearance, thereby bearing against said inner and outer raceway portions to maintain the longitudinal axis of said shaft coincident with the longitudinal axis of said casing.

5. A high speed spindle assembly comprising, in combination, an outer elongated tubular casing; an elongated shaft of a substantially smaller transverse cross-sectional area than the inner transverse cross-sectional area of said casing and mounted within said casing with its longitudinal axis substantially parallel to the longitudinal axis of said casing; a pair of inner ball bearing raceway portions located on said shaft, said inner raceway portions being spaced from each other; a pair of outer oppositely directed, angular ball bearing raceway portions connected to the inner surface of said casing and located respectively opposite to said inner raceway portions; and a plurality of ball members each having a radius of curvature which is smaller than the radius of curvature of each of said raceway portions and being mounted with clearance between said inner and outer raceway portions, and the lines connecting the opposite points of contact between each of said ball members and said inner and outer raceway portions making one angle with the longitudinal axis of said casing when the shaft is at rest and making a different angle with the longitudinal axis of said casing when the shaft is rotating, whereby said shaft, when at rest, has play in said casing both in axial and radial directions so that when said shaft is rotated said ball members move along said raceway portions into a position in contact with said inner and outer raceway portions so as to take up said clearance, thereby automatically bearing against said inner and outer raceway portions to maintain the longitudinal axis of said shaft coincident with the longitudinal axis of said casing.

ROBERT ANNEN.

REFERENCES CITED

The following references are of record in the file of this patent:

UNITED STATES PATENTS

| Number | Name | Date |
| --- | --- | --- |
| 1,418,886 | Searles | June 6, 1922 |
| 1,736,972 | Hutchinson | Nov. 26, 1929 |
| 1,906,243 | Baninger | May 2, 1933 |
| 1,926,999 | Keller | Sept. 12, 1933 |
| 2,151,830 | Bruhl | Mar. 28, 1939 |
| 2,232,159 | Blood | Feb. 18, 1941 |